US012578516B2

(12) United States Patent
　　Kusaka et al.

(10) Patent No.:　US 12,578,516 B2
(45) Date of Patent:　　Mar. 17, 2026

---

(54) LIGHT DIFFRACTION ELEMENT UNIT AND OPTICAL COMPUTATION DEVICE

(71) Applicant: FUJIKURA LTD., Tokyo (JP)

(72) Inventors: Hiroyuki Kusaka, Tokyo (JP);
　　　　　　　Masahiro Kashiwagi, Tokyo (JP)

(73) Assignee: FUJIKURA LTD., Tokyo (JP)

( * ) Notice:　Subject to any disclaimer, the term of this patent is extended or adjusted under 35 U.S.C. 154(b) by 315 days.

(21) Appl. No.:　18/274,557

(22) PCT Filed:　Jan. 14, 2022

(86) PCT No.:　PCT/JP2022/001047
　　§ 371 (c)(1),
　　(2) Date:　Jul. 27, 2023

(87) PCT Pub. No.:　WO2022/176458
　　PCT Pub. Date: Aug. 25, 2022

(65) Prior Publication Data
　　US 2024/0085600 A1　　Mar. 14, 2024

(30) Foreign Application Priority Data
　　Feb. 18, 2021　(JP) ................................. 2021-024501

(51) Int. Cl.
　　*G02B 5/18*　　　(2006.01)
　　*G06N 3/067*　　(2006.01)

(52) U.S. Cl.
　　CPC ............... *G02B 5/18* (2013.01); *G06N 3/067* (2013.01)

(58) Field of Classification Search
　　CPC ...... G02B 5/18; G02B 5/1809; G02B 5/1871; G06N 3/067; G06E 3/001
　　　　　　(Continued)

(56) References Cited

U.S. PATENT DOCUMENTS

| | | | |
|---|---|---|---|
| 7,847,225 B2 | 12/2010 | Yokoyama | |
| 2021/0142170 A1* | 5/2021 | Ozcan ................ | G02B 27/4205 |

FOREIGN PATENT DOCUMENTS

| | | | |
|---|---|---|---|
| JP | 2006-001050 A | | 1/2006 |
| JP | 2009134232 A | * | 6/2009 |

(Continued)

OTHER PUBLICATIONS

Xing Lin et al: "All-Optical Machine Learning Using Diffractive Deep Neural Networks" arxiv.org, Cornell University Library, 201 Olin Library Cornell University Ithaca, NY 14853, Apr. 14, 2018 (Apr. 14, 2018), XP081108166, DOI: 10.1126/SCIENCE.AAT8084 (20 pages).

(Continued)

*Primary Examiner* — Brandi N Thomas
*Assistant Examiner* — Boutsikaris Leonidas
(74) *Attorney, Agent, or Firm* — Osha Bergman Watanabe & Burton LLP

(57)　　　　　　　ABSTRACT

A light diffraction element unit includes a base material including a light-transmissive and flexible layer member, a light diffraction structure including microcells and disposed on a portion of a main surface of the base material, and a holding part holding the base material and including a layer member or a plate member having an opening that penetrates through a pair of main surfaces of the layer member or the plate member. The holding part holds an annular portion of the base material such that the light diffraction structure is encompassed in the opening. The annular portion surrounds the portion of the main surface of the base material.

7 Claims, 4 Drawing Sheets

(58) Field of Classification Search
      USPC .......................................................... 359/558
      See application file for complete search history.

(56)                         References Cited

FOREIGN PATENT DOCUMENTS

| JP | 2010145672 | A | * | 7/2010 |
| JP | 2015121639 | A | * | 7/2015 |
| JP | 2018189939 | A | * | 11/2018 |
| JP | 2020-024284 | A | | 2/2020 |
| WO | 2019/147828 | A1 | | 8/2019 |
| WO | 2019200289 | A1 | | 10/2019 |

OTHER PUBLICATIONS

Written Opinion of International Searching Authority issued in corresponding International Application No. PCT/JP2022/001047 dated Mar. 8, 2022 (6 pages).
International Search Report issued in corresponding International Application No. PCT/JP2022/001047 dated Mar. 8, 2022 (2 pages).

* cited by examiner

A-A'

LIGHT DIFFRACTION ELEMENT UNIT AND OPTICAL COMPUTATION DEVICE

BACKGROUND

Technical Field

The present invention relates to a light diffraction element unit including a light diffraction structure which is made of a plurality of microcells, and an optical computing device including a plurality of such light diffraction element units.

DESCRIPTION OF THE RELATED ART

Known is a light diffraction element which includes: a base material that is made of a layer member that is light-transmissive; and a light diffraction structure that is formed on one of main surfaces of the base material. The light diffraction structure includes a plurality of microcells each of which has an individually set thickness or refractive index. The light diffraction structure optically executes predetermined computing by causing mutual interference of signal light beams that have passed through the respective microcells. The term "microcell" here refers to, for example, a cell having a cell size of less than 10 μm. Further, note that the term "cell size" refers to a square root of an area of a cell.

A plurality of such light diffraction elements is used to periodically disposing light diffraction structures along a direction in which signal light propagates (i.e., a thickness direction of the microcells). This results in an optical computing device that carries out, a plurality of times, optical computing which is optical computation. Such an optical computing device has advantages of high speed and low power consumption as compared with an electrical computing device that uses a processor. Patent Literature 1 discloses an optical neural network that has an input layer, an intermediate layer, and an output layer. The light diffraction element described above can be used, for example, as an intermediate layer of such an optical neural network.

PATENT LITERATURE

Patent Literature 1: U.S. Pat. No. 7,847,225

In such an optical computing device, an interval D between the light diffraction structures periodically disposed is roughly determined in accordance with a wavelength A of the signal light. An example of this interval D is D=40λ. Specifically, in a case where light having λ=1.5 μm is employed as the signal light, D=60 μm. In this case, it is required that a sum of a thickness of the base material and a maximum value of thicknesses of the microcells be 60 μm or less. Therefore, a resin film having a small thickness is often employed as the base material of the light diffraction element. Examples of the thickness of the resin film include 3 μm and 5 μm. Such a resin film is flexible, so that it is difficult for the resin film as is to correctly maintain a planar shape of the main surface.

SUMMARY

One or more embodiments provide a light diffraction element unit that, by itself, easily maintains a planar shape of a main surface of a base material, and an optical computing device including a plurality of such light diffraction element units.

A light diffraction element unit in accordance with one or more embodiments includes: a base material that is a layer member being light-transmissive and flexible; a light diffraction structure formed on a portion of one of main surfaces of the base material and including a plurality of microcells; and a holding part holding the base material, the holding part including a layer member or plate-like member (example of a plate member) provided with an opening that penetrates through a pair of main surfaces of the layer member or plate-like member. The present light diffraction element unit employs a configuration in which the holding part holds an annular portion of the base material so that the light diffraction structure is encompassed in the opening, the annular portion surrounding the portion of the one of the main surfaces of the base material.

An optical computing device in accordance with one or more embodiments comprising first to N-th light diffraction element units (N is an integer of 2 or larger) each being the light diffraction element unit according to one or more embodiments; and a housing that accommodates the first to N-th light diffraction element units in order along a normal direction of the one main surface of the base material.

One or more embodiments make it possible to provide a light diffraction element unit that, by itself, easily maintains a planar shape of a main surface of a base material, and an optical computing device including a plurality of such light diffraction element units.

DESCRIPTION OF THE EMBODIMENTS

Example 1

<Configuration of Light Diffraction Element Unit>

Figure 1:
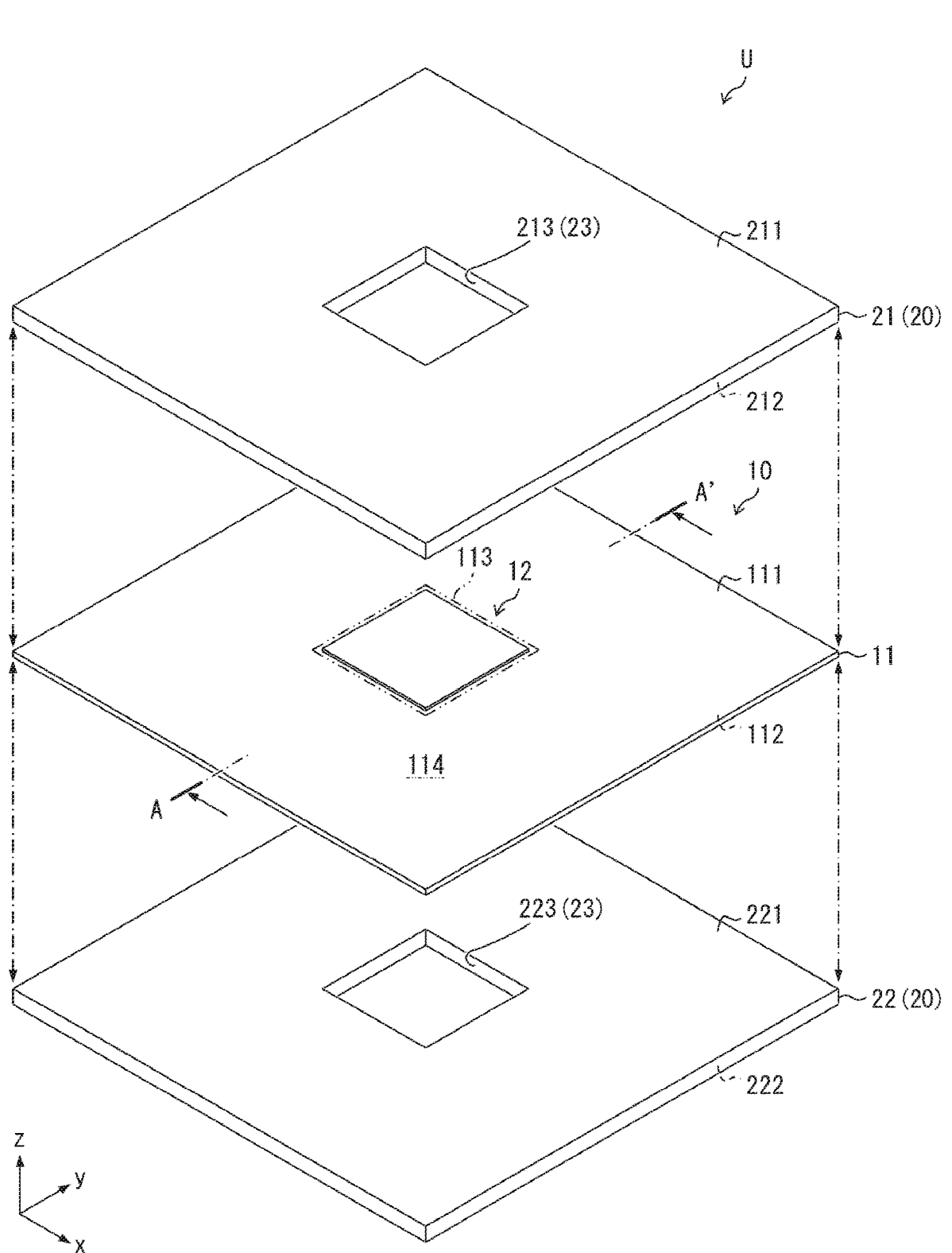
FIG. 1 is an exploded perspective view illustrating a light diffraction element unit in accordance with Example 1.
Figure 2:
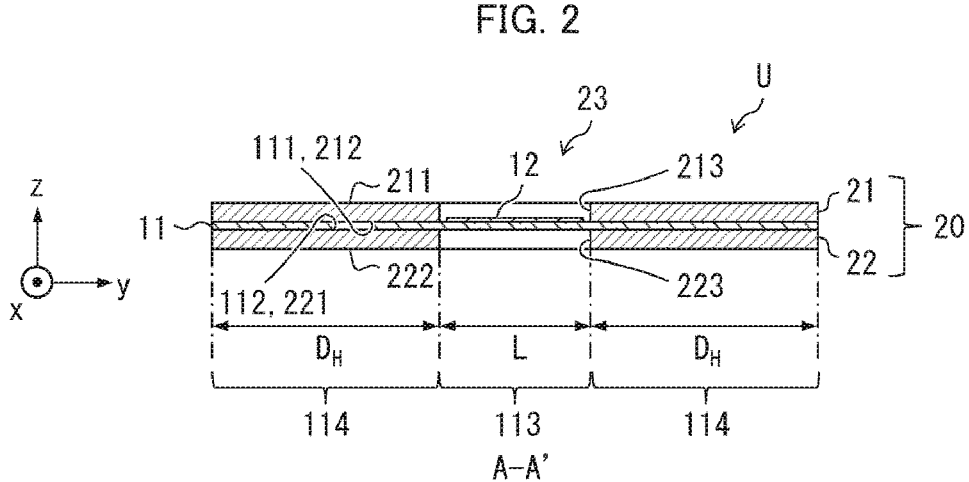
FIG. 2 is a cross sectional view of the light diffraction element unit illustrated in FIG. 1.
Figures 3, 4:
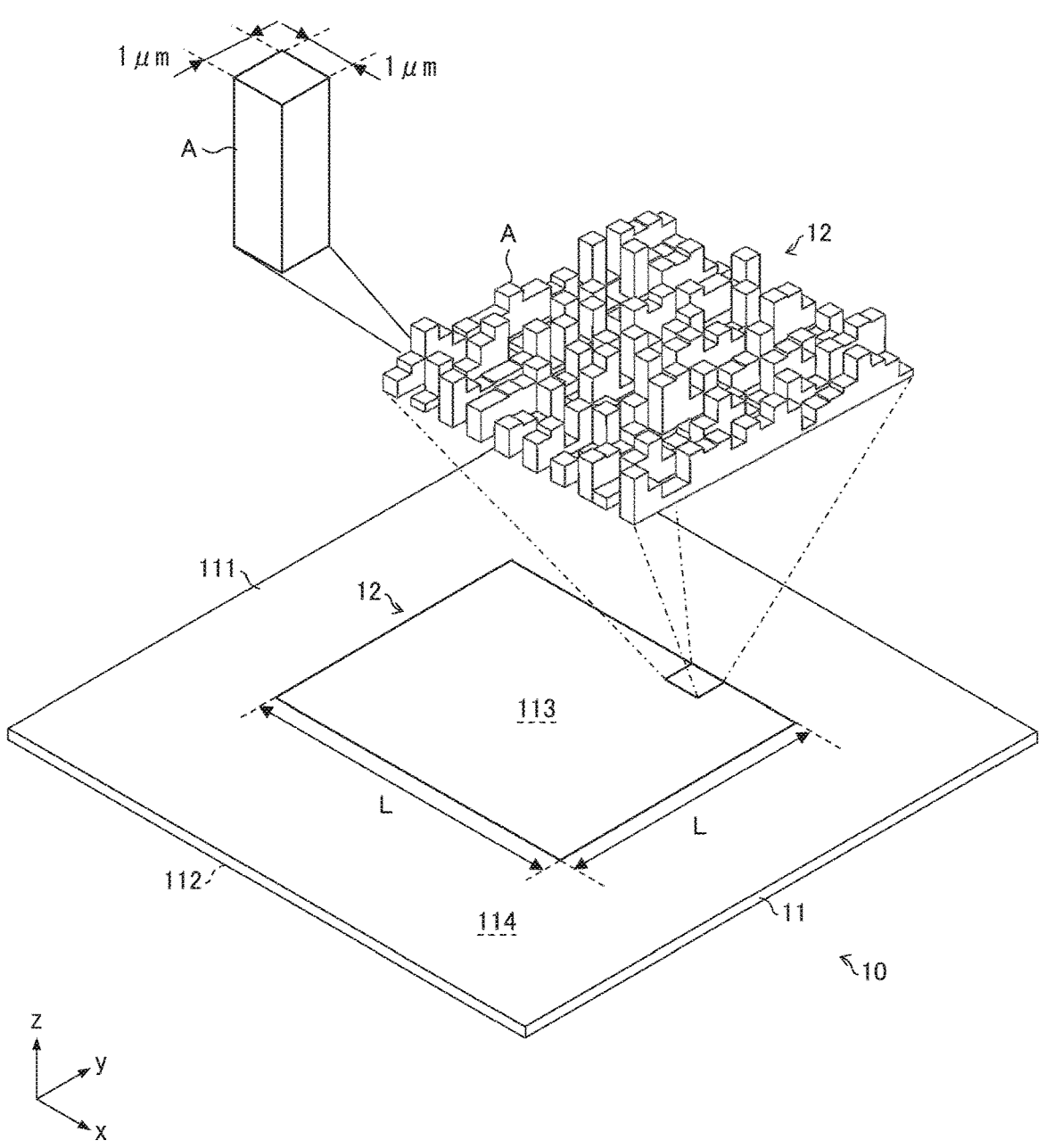
FIG. 3 is a perspective view illustrating a light diffraction element that is provided in the light diffraction element unit illustrated in FIG. 1.
FIG. 4 is a cross sectional view of a first variation of the light diffraction element unit illustrated in FIG. 1.

The following will discuss a light diffraction element unit U in accordance with Example 1, with reference to FIGS. 1 to 3. FIG. 1 is an exploded perspective view illustrating the light diffraction element unit U. FIG. 2 is a cross sectional view of the light diffraction element unit U and shows an A-A' cross section taken along line A-A' shown in FIG. 1. The A-A' cross section is a cross section that is perpendicular to a main surface 211 and a main surface 222 of the holding part 20 which face each other and that passes through a light diffraction structure 12. FIG. 3 is a perspective view of the light diffraction element 10 that is provided in the light diffraction element unit U. Note that the main surface 211 and the main surface 222 will be described later. Furthermore, in an orthogonal coordinate system illustrated in each of FIGS. 1 to 3, normal directions of the main surface 211 and the main surface 222 are defined as the z-axis direction. Also, in a plane parallel to the main surface 211 and the main surface 222, two parallel to respective sides of the light diffraction structure 12 are defined as the x-axis direction and the y-axis direction.

As illustrated in FIGS. 1 and 2, the light diffraction element unit U includes a light diffraction element 10 and a holding part 20.

Note that in Example 1, light having a wavelength λ of λ=1.5 μm is used as signal light. Further, the signal light has a two-dimensional intensity distribution in a plane orthogonal to a propagation direction of the signal light. The light diffraction structure 12 (which will be described later) includes a plurality of microcells A each of which has an individually set thickness or refractive index. The light diffraction structure 12 optically executes predetermined computing by causing mutual interference of signal light beams that have passed through the respective microcells A.

Note that the wavelength A is not limited to 1.5 μm and can be set as appropriate within a band of electromagnetic waves. For example, the band includes a visible region (360 nm or more and less than 830 nm), a near infrared region (830 nm or more and less than 2 μm), a mid-infrared region (2 μm or more and less than 4 μm), and a far infrared region (4 μm or more and 1000 μm or less). The wavelength λ may be at least a part of the wavelengths that are included in the band of 360 nm or more and 1000 μm or less. Signal light having λ=1.5 μm is an example of light having a specific wavelength. Note that the wavelength λ of the signal light is determined, in a design stage of the light diffraction element unit U, according to an intended use etc. of the light diffraction element unit. Light used as the signal light may be, for example, visible light or near-infrared light.
(Light Diffraction Element)

As illustrated in FIG. 3, the light diffraction element 10 includes a base material 11 and a light diffraction structure 12.

The base material 11 is a layer member (e.g., a film) which has a main surface 111 and a main surface 112 that face each other. The base material 11 is made of a light-transmissive material. The main surface 111 is an example of one of the main surfaces of the base material 11. In the following description, a central portion 113 refers to a portion of the base material 11, the portion being located in the center of the main surface 111 of the base material 11, and an annular portion 114 refers to a ring-like portion that surrounds the central portion 113. Note that FIG. 3 shows that the central portion 113 is located in a lower layer of the light diffraction structure 12, by adding an underline shown by a broken line to the reference numeral "113".

Example 1 employs an acrylic resin as a material constituting the base material 11. Note however that the material constituting the base material 11 only needs to be light-transmissive in a wavelength range of light used as the signal light, and is not limited to a resin typified by an acrylic resin. The material constituting the base material 11 may be a glass material typified by quartz glass.

It is also preferable that the material constituting the base material 11 be a material that, when the light diffraction structure 12 (which will be described later) is formed on the main surface 111, has good adhesion to a resin (e.g., a photo-cured resin) constituting the light diffraction structure 12.

Furthermore, Example 1 employs a thickness of 5 μm as a thickness of the base material 11. Because a resin film having such a thickness is flexible, the resin film cannot be self-supporting by itself. The thickness of the base material 11 is not limited to 5 μm.

Furthermore, a shape (hereinafter, referred to as a shape in a plan view) in a case where the base material 11 is viewed in a plan view from a normal direction of the main surface 111 is a square and matches a shape in a plan view of the holding part 20 (which will be described later) (FIG. 1). In Example 1, a size of the base material 11 in the plan view (i.e., a size of an outer edge of the annular portion 114) is equal to a size of the holding part 20 in a plan view. However, the size of the base material 11 only needs to be larger than the size of the central portion 113 (which will be described later), and can be set as appropriate within such a range.

In such an optical computing device A (see FIG. 6) that is provided with a plurality of light diffraction element units U, an interval D between light diffraction structures 12 periodically disposed is roughly determined in accordance with the wavelength λ of the signal light. An example of this interval D is D=40λ. Specifically, in Example 1 in which the light having λ=1.5 μm is employed as the signal light, D=60 μm. In this case, it is required that a sum of the thickness of the base material 11, the maximum value of the thickness of the light diffraction structure 12, and a thickness of the holding part 20 (which will be described later) be 60 μm or less. The thickness of the base material 11 can be set as appropriate within a range satisfying the condition. Note that even in a case where a thickness of 60 μm is employed as the thickness of the base material 11, the base material 11 is flexible. Accordingly, one or more embodiments are also applicable to such a case, depending on the wavelength A.

The light diffraction structure 12 is formed in the central portion 113. In Example 1, the central portion 113 has, for example, a 200 μm×200 μm square. The light diffraction structures 12 is constituted by a plurality of microcells A that have respective thicknesses or refractive indices set independently of each other (see FIG. 3). In Example 1, each of the microcells A is made of a resin (e.g., a photo-cured resin) that is light-transmissive. However, the light diffraction structure 12 may be made of glass (for example, quartz glass).

Upon entry of the signal light into the light diffraction structure 12, signal light beams that have passed through the respective microcells A mutually interfere with each other, so that predetermined optical computing is carried out. The intensity distribution of the signal light that is outputted from the light diffraction structure 12 represents a result of the optical computing.

The term "microcell" here refers to, for example, a cell having a cell size of less than 10 μm. Further, note that the term "cell size" refers to a square root of an area of a cell. For example, in a case where a microcell has a square shape in a plan view, the cell size is a length of one side of the cell. The cell size has a lower limit that is not particularly limited but can be, for example, 1 nm.

The light diffraction structure 12 illustrated in an enlarged view of FIG. 1 is constituted by 20×20 microcells A that are provided in a matrix pattern. The microcells A each have, for example, a 1 μm×1 μm square shape in a plan view, and the light diffraction structure 12 has, for example, a 200 μm×200 μm square shape.

Note that the cell size, the shape of each of the microcells A in a plan view, and the shape of the light diffraction structure 12 in a plan view are not limited to the above-described examples, and can be set as appropriate.
(Holding Part)

The holding part 20 is a layer member or plate-like member (e.g., foil) which has a main surface 211 and a main surface 222 that face each other. In Example 1, the holding part 20 is constituted by a first member 21 and a second member 22. The first member 21 is a layer member or plate-like member (e.g., foil) having the main surface 211 and the main surface 212 that face each other. The second member 22 is a layer member or plate-like member (e.g., foil) having the main surface 221 and the main surface 222 that face each other.

The holding part 20 is provided with an opening 23 that penetrates through the main surface 211 and the main surface 222, which make a pair of main surfaces. In Example 1, the first member 21 is provided with a first opening 213 which penetrates through the main surface 211 and the main surface 212 that make a pair of main surfaces, and the second member 22 is provided with a second opening 223 which penetrates through the main surface 221 and the main surface 222 that make another pair of main surfaces. The opening 23 is constituted by the first opening 213 and the second opening 223.

The holding part 20 holds the annular portion 114 of the base material 11 so that the light diffraction structure 12 is encompassed in the opening 23 when the main surface 211 is viewed in a plan view from the normal direction of the main surface 211. More specifically, the holding part 20 holds the base material 11 by sandwiching the annular portion 114 between the first member 21 and the second member 22.

In Example 1, the main surface 111 of the base material 11 and the main surface 212 of the first member 21 are fixed to each other by an adhesive layer (not illustrated in FIGS. 1 and 2). Similarly, the main surface 112 of the base material 11 and the main surface 221 of the second member 22 are fixed to each other by an adhesive layer (not illustrated in FIGS. 1 and 2). These adhesive layers are examples of bonding means for bonding the base material 11, the first member 21, and the second member 22 to each other. However, the bonding means are not limited to such an adhesive layer but can be selected as appropriate.

Example 1 employs an aluminum alloy as a material constituting the holding part 20. Note that the material constituting the holding part 20 only needs to have a higher rigidity than the base material 11 in order to hold the base material 11, and is not limited to an aluminum alloy. Examples of other metallic materials that may constitute the holding part 20 include stainless steel and copper. The material constituting the holding part 20 may be a resin material such as a glass fiber-reinforced resin or a carbon fiber-reinforced resin.

Of the pair of the main surfaces 211 and 222 of the holding part 20, it is preferable that at least one of the main surfaces be configured so as to have a signal light absorption rate that is larger than a signal light absorption rate of aluminum. More preferably, all of surfaces of the holding part 20 is configured to have a signal light absorption rate that is larger than the signal light absorption rate of aluminum. Note that a signal light absorption rate of an aluminum alloy can be regarded as being substantially equal to the signal light absorption rate of aluminum.

A surface of aluminum used in defining the absorption rate may be a non-oxidized surface, but is preferably an oxidized surface that has a higher absorption rate. For example, in a case where $\lambda=1$ μm, a signal light absorption rate of a non-oxidized surface of aluminum is approximately 10%, and a signal light absorption rate of an oxidized surface of aluminum is approximately 40%. More preferably, at least one of the pair of the main surfaces 211 and 222 is configured or the all of the surfaces of the holding part 20 are configured such that the signal light absorption rate of an aluminum alloy is 50% or more.

Example 1 is configured such that the absorption rate of all of the surfaces of the holding part 20 is larger than the signal light absorption rate of aluminum. Note that all of the surfaces of the holding part 20 include the main surface 211, the main surface 212, an inner surface of the first opening 213, an outer surface of the first member 21, the main surface 221, the main surface 222, an inner surface of the second opening 223, and an outer surface of the second member 22. In a case where the main surface 212 and the main surface 221 are configured in a manner similar to the main surface 211 and the main surface 222 so as to have an absorption rate larger than the signal light absorption rate of aluminum, it is possible that the main surface 212 and the main surface 221 absorb stray light if the stray light propagating in an in-plane direction of the base material 11 occurs for some reason. Thus, the light diffraction element unit U can absorb the stray light before the stray light propagates up to an outer edge of the base material 11. This makes it possible to reduce stray light that may be emitted to the outside. Note that the higher the signal light absorption rate is, the more the stray light can be reduced.

Note that a configuration for absorbing the signal light is not limited. It is possible to have, as the configuration for absorbing the signal light, a configuration in which a black coating film is provided on a surface of the holding part 20 or a configuration in which a metasurface light diffraction structure, which absorbs light in a wavelength range that includes the wavelength $\lambda$ of the signal light, is provided. An example of the black coating film is a black paint film. The black paint film may contain carbon black. Furthermore, as in Example 1, in a case where the holding part 20 is made of an aluminum alloy, it is possible to use, as a featured coating layer, a black oxide layer that is formed by performing a black anodizing treatment on the surface of the holding part 20. In a case where a resin is employed as the material constituting the holding part 20, it is also possible to use, as the material, a resin which absorbs light in a wavelength range that includes the wavelength $\lambda$ of the signal light.

Furthermore, as illustrated in FIG. 2, it is preferable that the distance $D_H$ from the opening 23 to the outer edge of the holding part 20 satisfies $D_H \geq 2^{1/2} \times L$ where a length L is one side of the opening 23. Note that in Example 1, a shape of the opening 23 is a square corresponding to respective shapes of the central portion 113 and the light diffraction structure 12. Note, however, that the shape of the opening 23 is not limited to a square and can be set as appropriate. In a case where the shape of the opening 23 is not a square, it is possible to use a square root of an area of the opening 23 as an opening size L instead of the length L of one side of the opening 23. Note that the length L of one side of the opening 23 is an example of the opening size L.

Furthermore, in Example 1, the holding part 20 is constituted by the first member 21 and the second member 22. However, in the holding part 20, the first member 21 or the second member 22 can be omitted. In a case where the first member 21 or the second member 22 is omitted, the second member 22 is preferably omitted. In a case where the second member 22 is omitted, the light diffraction structure 12 can be accommodated inside the 213 of the first member 21, so that the light diffraction structure 12 can be protected from, for example, a collision with a foreign matter.

<First Variation>

The following description will discuss, with reference to FIG. 4, a light diffraction element unit UA which is a first variation of the light diffraction element unit U. FIG. 4 is a cross sectional view of the light diffraction element unit UA. A cross section of the light diffraction element unit UA illustrated in FIG. 4 is, like the cross section of the light diffraction element unit U illustrated in FIG. 2, a cross section that is perpendicular to a main surface 211B and a main surface 222B of the holding part 20 which face each other and that passes through the light diffraction structure 12. Note that an orthogonal coordinate system illustrated in FIG. 4 is defined in the same manner as that shown in FIGS. 1 to 3.

The light diffraction element unit UA is obtained, with use of the light diffraction element unit U as a base, by (i) deforming the base material 11 constituting the light diffraction element 10 to a base material 11A and (ii) adding an absorbing layer 30A. The following description will discuss the base material 11A and the absorbing layer 30A among constituent members of the light diffraction element unit UA, and descriptions of members common to the light diffraction element unit U will be omitted.

(Base Material)

As illustrated in FIG. 4, the base material 11A is obtained by deforming the base material 11 such that the size of the base material 11 illustrated in FIG. 2 is reduced. Note that the size that is reduced here is only a size of the outer edge of the base material 11, and a size of a region (the central portion 113 of the base material 11) in which the light diffraction structure 12 is formed is the same as in the case of the base material 11.

(Absorption Layer)

Since the size of the base material 11A is reduced, an annular gap is formed between the first member 21 and the second member 22 and outside the base material 11A in a case where the base material 11A is sandwiched between the first member 21 and the second member 22. The absorbing layer 30A is formed with a resin that fills the annular gap. The resin that forms the absorbing layer 30A includes a resin or filler which absorbs light in the wavelength range that includes the wavelength λ of the signal light.

In the light diffraction element unit U, in a case where stray light that propagates in the in-plane direction of the base material 11 occurs for some reason, the stray light may propagate up to the outer edge of the base material 11 and be emitted to the outside of the light diffraction element unit U.

In the light diffraction element unit UA, even in a case where such stray light is emitted from the outer edge of the base material 11A, the absorption layer 30A can absorb the stray light. Thus, the light diffraction element unit UA can reduce the stray light that may be emitted to the outside.

<Second Variation>

Figure 5:
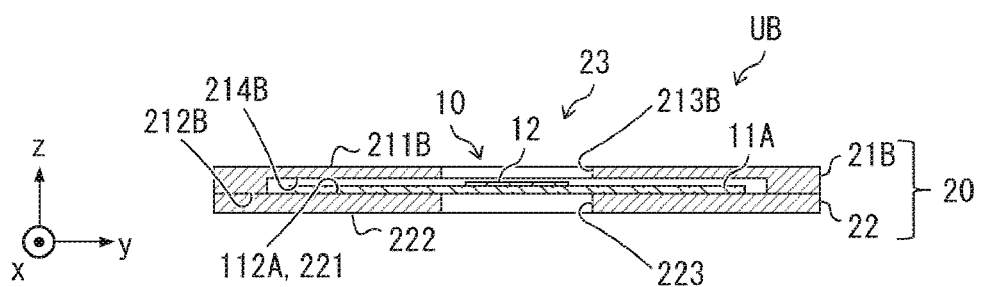
FIG. 5 is a cross sectional view of a second variation of the light diffraction element unit illustrated in FIG. 1.

The following description will discuss, with reference to FIG. 5, a light diffraction element unit UB which is a second variation of the light diffraction element unit U. FIG. 5 is a cross sectional view of the light diffraction element unit UB. A cross section of the light diffraction element unit UB illustrated in FIG. 5 is, like the cross section of the light diffraction element unit U illustrated in FIG. 2, a cross section that is perpendicular to the main surface 211B and the main surface 222B of the holding part 20 which face each other and that passes through the light diffraction structure 12. Note that an orthogonal coordinate system illustrated in FIG. 5 is defined in the same manner as that shown in FIGS. 1 to 3.

The light diffraction element unit UB is obtained, with use of the light diffraction element unit U as a base, by (i) deforming the base material 11 constituting the light diffraction element 10 to the base material 11A and (ii) deforming the first member 21 to a first member 21B. Note that the base material 11A included in the light diffraction element unit UB is the same as the base material 11A included in the light diffraction element unit UA. Therefore, the following description will discuss the first member 21B among constituent members of the light diffraction element unit UB, and descriptions of members common to the light diffraction element unit U will be omitted.

A main surface 212B of the first member 21B on a second member 22 side is provided with a recess 214B that accommodates the light diffraction element 10. The recess 214B is formed so as to be continuous from the first opening 213B. Note that the first opening 213B corresponds to the first opening 213 of the first member 21.

According to this configuration, even in a case where stray light that propagates in the in-plane direction of the base material 11A is emitted from the outer edge of the base material 11A, it is possible to reduce the stray light that is emitted to the outside of the light diffraction element unit UB.

Note that in order to quickly absorb the stray light that propagates inside the recess 214B, the surface of the recess 214B is preferably configured to have, as in the cases of the main surface 211 and the main surface 222, a signal light absorption rate larger than the signal light absorption rate of aluminum.

Example 2

<Configuration of Optical Computing Device>

Figure 6:
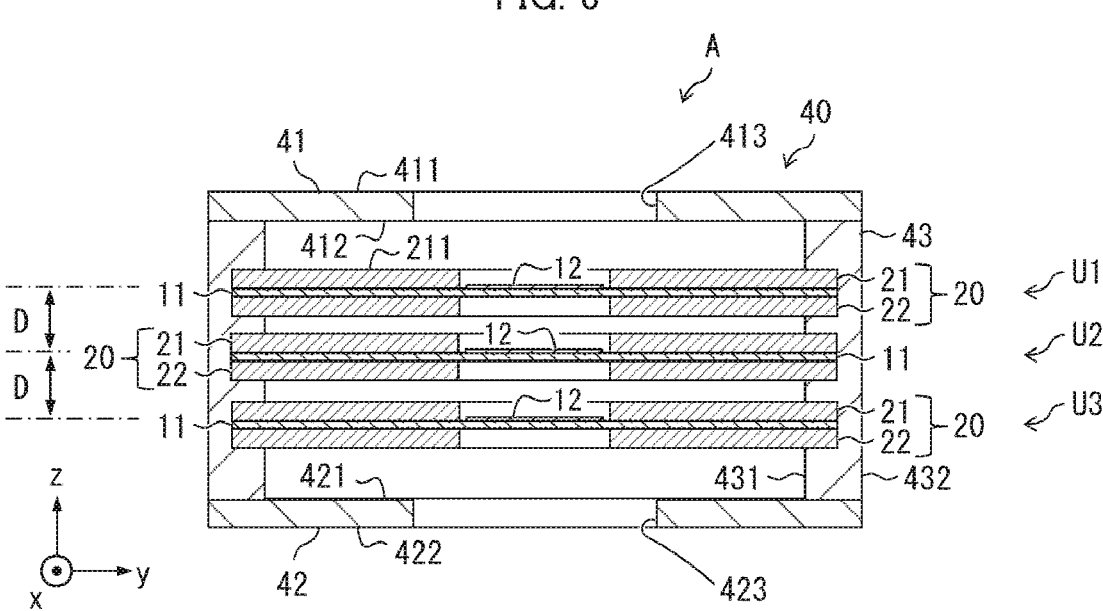
FIG. 6 is a cross sectional view illustrating an optical computing device in accordance with Example 2.

The following description will discuss, with reference to FIG. 6, a configuration of an optical computing device A in accordance with Example 2. FIG. 6 is a cross sectional view illustrating the optical computing device A. A cross section of the optical computing device A illustrated in FIG. 6 is, like the cross section of the light diffraction element unit U illustrated in FIG. 2, a cross section that passes through a light diffraction structure 12 and that is perpendicular to a main surface 211 and a main surface 222 which a holding part 20 of each of light diffraction element units U has and which face each other.

As illustrated in FIG. 6, the optical computing device A includes three light diffraction element units U1, U2, and U3 and a housing 40 that accommodates the light diffraction element units U1, U2, and U3. Each of the light diffraction element units U1, U2, and U3 is a light diffraction element unit U described in Example 1, which is an example of each of first to N-th light diffraction element units (N is an integer of 2 or larger). In Example 2, in order to distinguish each of the three light diffraction element units U from the other light diffraction element units U, a reference numeral is provided at an end of the reference sign. Note that the number of the light diffraction element units U of the optical computing device A is not limited to three, and can be set as appropriate in a range of 2 or more.

In Example 2, a description of the light diffraction element units U1, U2, and U3 will be omitted, and the housing 40 will be described.

Example 2 employs an aluminum alloy as a material that constitutes the housing 40. Note, however, that the material constituting the housing 40 only needs to have sufficient rigidity in order to hold the light diffraction element units U1, U2, and U3, and is not limited to an aluminum alloy. Examples of other metallic materials that may constitute the housing 40 include stainless steel and copper. The material constituting the housing 40 may be a resin material such as a glass fiber-reinforced resin or a carbon fiber-reinforced resin.

The housing 40 has a rectangular parallelepiped shape and is a box in which a cavity is formed. As illustrated in FIG. 6, the housing 40 includes a pair of bottom walls 41 and 42 that face each other, and a side wall 43 that is provided between the bottom wall 41 and the bottom wall 42.

The bottom wall 41 includes a main surface 411 and a main surface 412, which make a pair of main surfaces that face each other. Similarly, the bottom wall 42 includes a main surface 421 and a main surface 422, which make a pair of main surfaces that face each other.

The side wall 43 is a tubular member whose transverse cross sectional shape is a square. The side wall 43 includes an inner surface 431 and an outer surface 432 that face each other. The side wall 43 has both ends that are provided with respective openings to which the bottom wall 41 and the bottom wall 42 joined to the ends are provided.

The bottom walls 41 and 42 are provided respectively with openings 413 and 423 in the vicinity of respective centers of the bottom walls 41 and 42. The shape and size of each of the openings 413 and 423 can be set as appropriate in accordance with the shape and size of the light diffraction structure 12. In Example 2, the shape of each of the openings 413 and 423 is a square when the openings 413 and 423 are viewed in a plan view from a normal direction (z-axis direction) of the main surface 211. Furthermore, in Example 2, the size of each of the openings 413 and 423 is set so that the light diffraction structure 12 is encompassed in the openings 413 and 423 when the openings 413 and 423 are viewed in a plan view.

The inner surface 431 of the side wall 43 is provided with respective grooves for holding the light diffraction element units U1, U2, and U3. Each of the grooves has a width that is substantially equal to a thickness of each of the light diffraction element units U1, U2, and U3. Each of the grooves is provided in an annular form along an entire circumference of the inner surface 431 and in parallel to the bottom walls 41 and 42. In the optical computing device A, each of the light diffraction element units U1, U2, and U3 is inserted into a corresponding one of the grooves so that the light diffraction element units U1, U2, and U3 are each held by the side wall 43.

An interval between adjacent grooves is set so that an interval D between adjacent light diffraction structures 12 in the optical computing device A has a predetermined value (e.g., D=60 μm (=40λ)). Three dash-dot-dash lines shown in FIG. 6 indicate respective positions of the light diffraction element units U1, U2, and U3 in a thickness direction (z-axis direction).

In the optical computing device A, the light diffraction element units U1, U2, and U3 are each accommodated in order along a normal direction (z-axis direction) of a pair of main surfaces (main surfaces 111 and 112 in FIG. 2) of each of base materials 11 inside the housing 40 so as to overlap with each other.

Furthermore, in Example 2, surfaces (the main surfaces 411 and 412, an inner surface of the opening 413, the main surfaces 421 and 422, an inner surface of the opening 423, the inner surface 431, and the outer surface 432) of the housing 40 are all configured such that, regardless of whether the surfaces are each on an inner side or an outer side, all of the surfaces have a signal light absorption rate larger than a signal light absorption rate of aluminum. As in the case of the holding part 20, it is possible to have, as such a configuration for absorbing the signal light, a configuration in which a black coating film is provided on a surface of the housing 40 or a configuration in which a metasurface light diffraction structure, which absorbs light in a wavelength range that includes a wavelength λ of the signal light, is provided. An example of the black coating film is a black paint film. The black paint film may contain carbon black.

Furthermore, in a case where the housing 40 is made of an aluminum alloy as in Example 2, it is possible to use, as a featured coating layer, a black oxide layer that is formed by performing a black anodizing treatment on the surface of the housing 40. In a case where a resin is employed as the material constituting the housing 40, it is also possible to use, as the material, a resin which absorbs light in the wavelength range that includes the wavelength λ of the signal light.

However, such a configuration for absorbing the signal light at the surface of the housing 40 may be omitted or may be provided only in a predetermined region of the surface of the housing 40. In a case where the configuration for absorbing the signal light is provided in only a predetermined region of the surface of the housing 40, an example of the predetermined region includes an inner wall (the main surface 412, the main surface 421, and the inner surface 431) of the housing 40. In addition to the inner wall of the housing 40, the configuration for absorbing the signal light may be provided on the inner surface of the opening 413 and on the inner surface of the opening 423.

One or more embodiments can also be expressed as follows:

A light diffraction element unit in accordance with a first aspect of one or more embodiments includes: a base material that is a layer member being light-transmissive and flexible; a light diffraction structure formed on a portion of one of main surfaces of the base material and including a plurality of microcells; and a holding part holding the base material, the holding part including a layer member or plate-like member provided with an opening that penetrates through a pair of main surfaces of the layer member or plate-like member. The present light diffraction element unit employs a configuration in which the holding part holds an annular portion of the base material so that the light diffraction structure is encompassed in the opening, the annular portion surrounding the portion of the one of the main surfaces of the base material.

According to the configuration described above, since the light diffraction structure is encompassed in the opening, the holding part does not affect light having a specific wavelength that passes through the light diffraction structure. Further, the holding part holds the annular portion of the base material. Thus, the base material is held so as to maintain a planar shape of the main surface of the base material. In this way, the present light diffraction element unit is capable of maintaining the planar shape of the main surface of the base material.

A light diffraction element unit in accordance with a second aspect of one or more embodiments employs, in addition to the above-described configuration of the light diffraction element unit in accordance with the first aspect, a configuration in which at least one of the pair of the main surfaces of the holding part has a higher absorption rate for light having a specific wavelength as compared to an absorption rate of aluminum for the light.

According to the above configuration, at least one of the pair of the main surfaces of the holding part is configured to absorb the light having the specific wavelength more than aluminum. Thus, in a case where stray light associated with the light having the specific wavelength enters the one of the main surfaces of the holding part, at least part of the stray light is absorbed by the one of the main surfaces. Thus, the present light diffraction element unit is capable of reducing stray light that may pass through the light diffraction element unit and that is associated with the light having the specific wavelength.

Note that the specific wavelength is a wavelength of an electromagnetic wave, and the specific wavelength can be set as appropriate in a design stage of the light diffraction element unit according to an intended use etc. thereof. An example of the specific wavelength is in the band of 360 nm or more and 1000 µm or less. Such a band includes a visible region (360 nm or more and less than 830 nm), a near infrared region (830 nm or more and less than 2 µm), a mid-infrared region (2 µm or more and less than 4 µm), and a far infrared region (4 µm or more and 1000 µm or less). The specific wavelength may be at least some of wavelengths that are included in the band of 360 nm or more and 1000 µm or less.

A light diffraction element unit in accordance with a third aspect of one or more embodiments employs, in addition to the above-described configuration of the light diffraction element unit in accordance with the first aspect or the second aspect, a configuration in which all of surfaces of the holding part have a higher absorption rate for light having a specific wavelength as compared to an absorption rate of aluminum for the light.

According to the above-described configuration, it is possible to reliably reduce stray light that may pass through the light diffraction element unit and that is associated with the light having the specific wavelength.

A light diffraction element unit in accordance with a fourth aspect of one or more embodiments employs, in addition to the above-described configuration of the light diffraction element unit in accordance with any one of the first aspect to the third aspect, a configuration in which the holding part includes a first member and a second member each of which is provided with the opening that penetrates through the pair of the main surfaces and each of which is a layer member or a plate-like member, the holding part holding the annular portion by sandwiching the annular portion between the first member and the second member.

According to the configuration described above, even in a case where stray light that propagates in an in-plane direction of a main surface of the base material occurs, the stray light is guided to between the first member and the second member. It is therefore possible to reduce leakage, toward a light diffraction element unit in a subsequent stage, of the stray light that propagates in the in-plane direction of the main surface of the base material.

A light diffraction element unit in accordance with a fifth aspect of one or more embodiments employs, in addition to the above-described configuration of the light diffraction element unit in accordance with any one of the first aspect or the fourth aspect, provided that a square root of an area of the opening is defined as a size L of the opening, a distance $D_H$ from the opening to an outer edge of the holding part satisfies $D_H \geq 2^{1/2} \times L$.

According to the above-described configuration, it is possible to reliably reduce stray light that may pass through the light diffraction element unit and that is associated with light having a specific wavelength.

An optical computing device according to a sixth aspect of one or more embodiments includes: first to N-th light diffraction element units (N is an integer of 2 or larger) each being the light diffraction element unit according to any one of the first aspect to the fifth aspect; and a housing that accommodates the first to N-th light diffraction element units in order along a normal direction of the one main surface of the base material.

According to the above configuration, it is possible to provide an optical computing device that includes a plurality of light diffraction element units in accordance with one or more embodiments, so that the same effect as the light diffraction element unit in accordance with one or more embodiments can be achieved.

Furthermore, an optical computing device in accordance with a seventh aspect of one or more embodiments employs, in addition to the above-described configuration of the optical computing device in accordance with the sixth aspect, a configuration in which an inner wall of the housing has a higher absorption rate for light having a specific wavelength as compared to an absorption rate of aluminum for the light.

According to the above-described configuration, it is possible to reduce stray light that may propagate in the optical computing device and that is associated with the light having the specific wavelength.

Additional Remarks

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

A optical computing device
U, UA, UB, U1, U2, U3 light diffraction element unit
10 light diffraction element
11, 11A, 11B base material
111 main surface (one main surface)
112 main surface
113 central portion (portion of one main surface of base material)
114 annular portion
12 light diffraction structure
20 holding part
23 opening
21, 21B first member
211, 212, 211B, 212B main surface
213, 213B first opening
22 second member
221, 222 main surface
223 second opening
40 housing
41, 42 bottom wall
411, 412, 421, 422 main surface
413, 423 opening
43 side wall
431, 432 inner surface, outer surface

The invention claimed is:

1. A light diffraction element unit comprising:
a base material including a light-transmissive and flexible layer member;
a light diffraction structure including microcells and disposed on a portion of a main surface of the base material; and
a holding part holding the base material and including a layer member or a plate member having an opening that penetrates through a pair of main surfaces of the layer member or the plate member, wherein
the holding part holds an annular portion of the base material such that the light diffraction structure is encompassed in the opening, the annular portion surrounds the portion of the main surface of the base material, and the holding part has a planar main surface on a side that holds the base material.

2. The light diffraction element unit according to claim 1, wherein one or both of a pair of main surfaces of the holding part have an absorption rate for light having a wavelength higher than an absorption rate of aluminum for the light.

3. The light diffraction element unit according to claim 1, wherein all surfaces of the holding part have an absorption rate for light having a wavelength higher than an absorption rate of aluminum for the light.

4. The light diffraction element unit according to claim 1, wherein the holding part includes a first member and a second member, each of which is either the layer member or the plate member having the opening, and the holding part holds the annular portion by sandwiching the annular portion between the first member and the second member.

5. A light diffraction element unit comprising:

a base material including a light-transmissive and flexible layer member;

a light diffraction structure including microcells and disposed on a portion of a main surface of the base material; and a holding part holding the base material and including a layer member or a plate member having an opening that penetrates through a pair of main surfaces of the layer member or the plate member, wherein the holding part holds an annular portion of the base material such that the light diffraction structure is encompassed in the opening, the annular portion surrounds the portion of the main surface of the base material, and a distance $D_H$ from the opening to an outer edge of the holding part satisfies $D_H \geq 2^{1/2} \times L$, where a square root of an area of the opening is defined as a size L of the opening.

6. An optical computing device comprising:

first to N-th light diffraction element units each of which is the light diffraction element unit according to claim 1, where N is an integer of 2 or larger; and a housing that accommodates the first to N-th light diffraction element units in order along a normal direction of each main surface of each base material of the first to N-th light diffraction element units.

7. The optical computing device according to claim 6, wherein an inner wall of the housing has an absorption rate for light having a wavelength higher than an absorption rate of aluminum for the light.

\* \* \* \* \*